Dec. 9, 1947.  H. E. RHEA  2,432,173
RADAR DIRECTION INDICATOR
Filed May 20, 1944  2 Sheets-Sheet 1
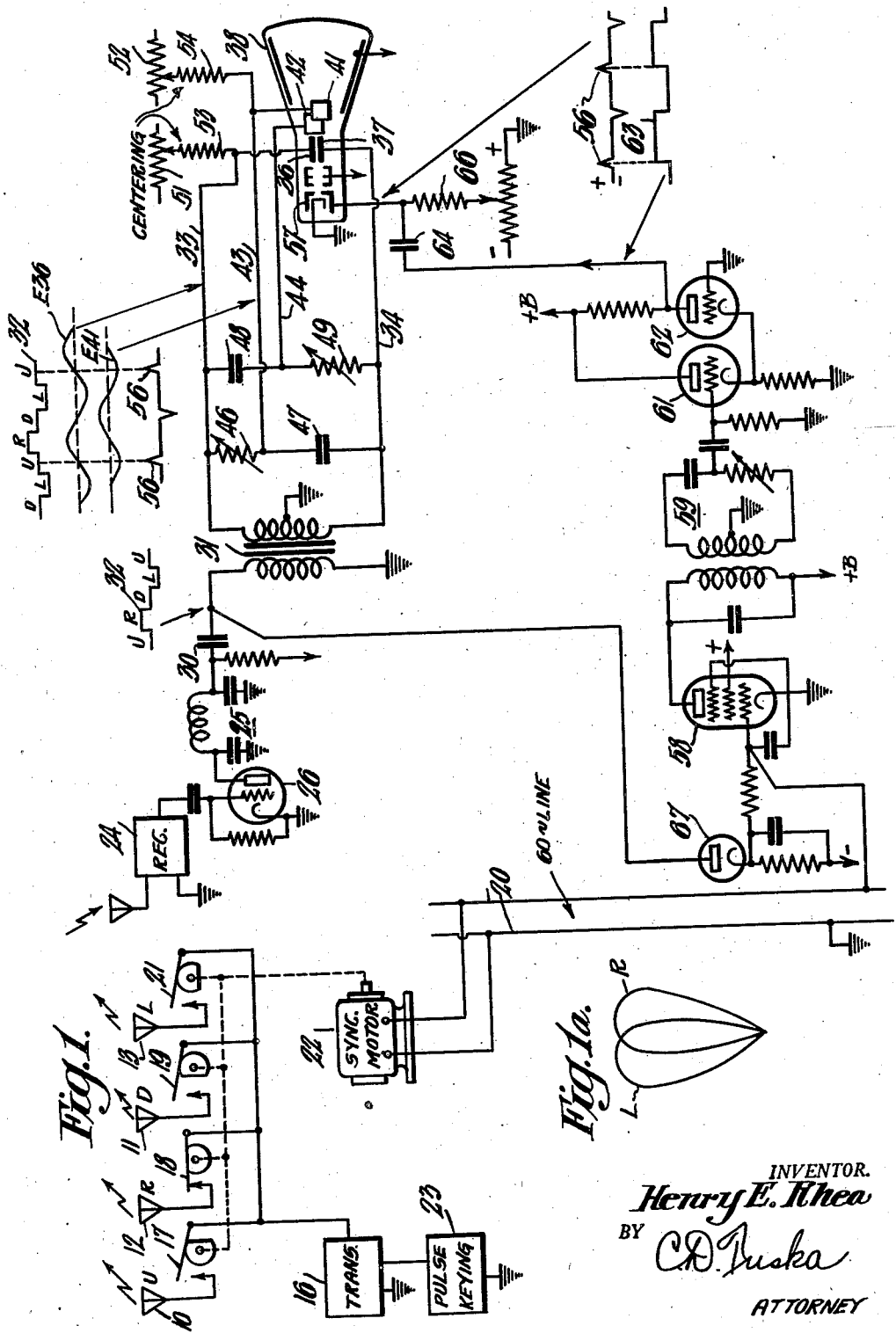
INVENTOR.
Henry E. Rhea
BY
C. D. Tuska
ATTORNEY Dec. 9, 1947.                H. E. RHEA                2,432,173
                     RADAR DIRECTION INDICATOR
            Filed May 20, 1944            2 Sheets-Sheet 2
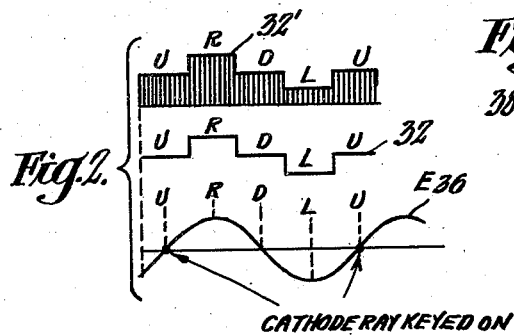
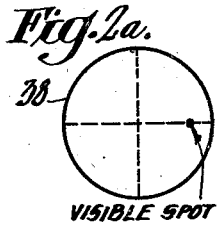
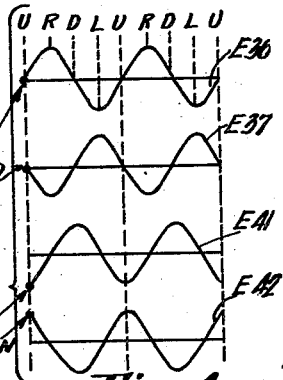
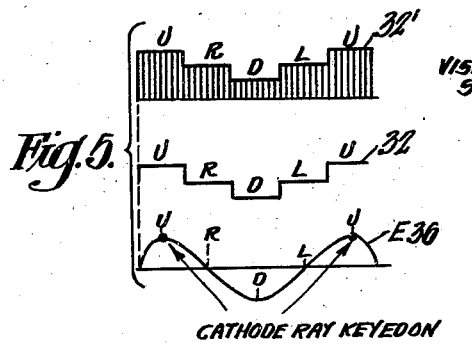
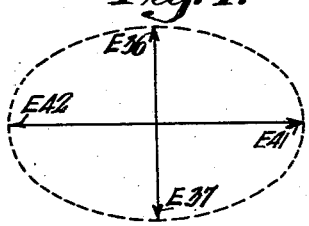
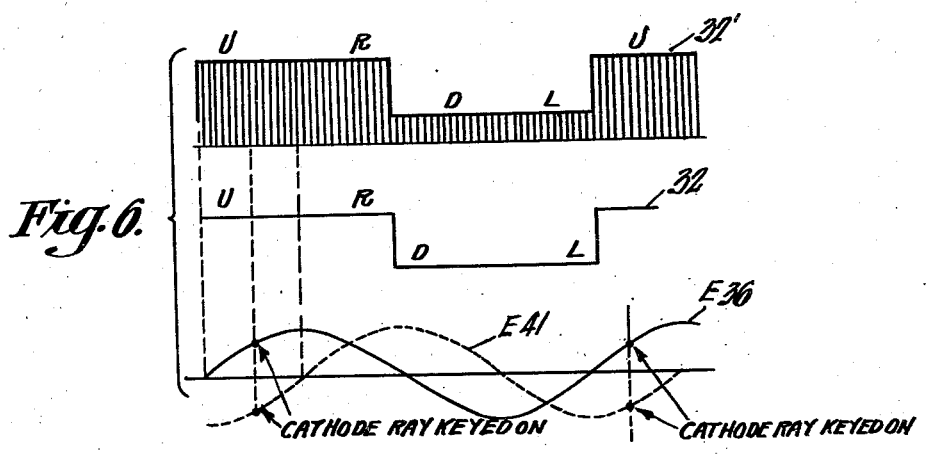
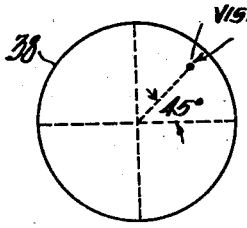
INVENTOR.
Henry E. Rhea
BY C. D. Tuska
ATTORNEY Patented Dec. 9, 1947

2,432,173

UNITED STATES PATENT OFFICE 2,432,173

RADAR DIRECTION INDICATOR

Henry E. Rhea, Collingswood, N. J., assignor to Radio Corporation of America, a corporation of Delaware Application May 20, 1944, Serial No. 536,619

6 Claims. (Cl. 250—1.72)

1

My invention relates to cathode ray indicator systems and particularly to systems for indicating the position of an object with respect to a radio transmitter.

The invention will be described specifically as applied to a pulse-echo locator system wherein the transmitter radiates signals from antennas having overlapping directional radiation patterns, the indicator functioning to give the position of the said object with respect to the radiation patterns, and particularly to inform an operator when the object is located at the middle of the overlapping patterns.

An object of the invention is to provide an improved indicator for direction finding or object locating apparatus.

A further object of the invention is to provide an improved cathode ray indicator system for indicating the position of an object with respect to overlapping radiation patterns.

A still further object of the invention is to provide an improved indicator for radio pulse-echo apparatus.

A still further object of the invention is to provide an improved indicator for pulse-echo gun control apparatus or the like wherein a cathode ray spot on the indicator is centered on crosshairs when the gun is on the target.

In a preferred embodiment, the invention is applied to a pulse-echo system having a directive antenna system having a plurality of overlapping radiation patterns and so designed that it may be rotated in both a horizontal plane and a vertical plane to search for an object such as an enemy airplane. The antenna system may consist of four directive antennas that are directed upward, downward, to the right and to the left, respectively. The antennas may be keyed successively in an up, right, down, left sequence by keying means such as described, for example, in application Serial No. 259,057, filed February 28, 1939, in the name of Irving Wolff, Patent No. 2,412,702, granted December 17, 1946, and entitled Object detection and location; or an antenna system may be employed which is keyed by means of shorting condensers as described and claimed in application Serial No. 412,943, filed September 30, 1941, in the name of George H. Brown, Patent No. 2,400,736, granted May 21, 1946, and entitled Antenna systems.

In the receiver, the horizontal and vertical deflecting plates of a cathode ray tube have applied to them sine wave deflecting voltages which are derived from the received pulses that have been reflected from the target or other object during the up, right, down, left antenna switching periods. The deflecting voltages at the horizontal and vertical deflecting plates are 90 degrees out of phase with respect to each other. In a preferred embodiment, the deflecting voltages are obtained by passing the demodulated up, right, down, left signals through a transformer and by applying the resulting sine wave voltage directly to one pair of deflecting plates and through a 90 degree phase shifting network to the other pair of deflecting plates. The cathode ray is normally biased to cut-off and is keyed on in a fixed time relation to the two deflecting voltages to produce a spot indication on the fluorescent screen of the tube. The horizontal position of the cathode ray at the instant it is keyed on is determined by the relative amplitudes of the reflected pulses in the two horizontal radiation patterns and its vertical position at this instant is similarly determined by the relative amplitudes of the reflected pulses in the two vertical radiation patterns.

The invention will be better understood from the following description taken in connection with the accompanying drawing in which Figure 1 is a circuit and block diagram of a preferred embodiment of my invention, Figure 1a is a diagram of a pair of radiation patterns of the directive antennas employed in the system of Fig. 1, Fig. 2 is a group of graphs which are referred to in describing the circuit operation for one position of the antenna radiation patterns with respect to the target, Figure 2a is a view of the screen end of the cathode ray tube employed in the system of Fig. 1 showing the position of the cathode ray spot for the relative positions of the transmitter radiation patterns and the object or target assumed for Fig. 2, Figure 3 is a group of graphs representing the deflecting voltages on the cathode ray tube deflecting plates for the condition assumed in Figs. 2 and 2a, Figure 4 is a vector diagram of the voltages represented in Fig. 3, and Figures 5 and 6 and Figures 5a and 6a correspond to Fig. 2 and Fig. 2a, respectively, for different relative positions of the antenna radiation patterns and the target.

In the several figures, similar parts are indicated by similar reference characters.

In Fig. 1, my improved indicator system is shown applied to a radio pulse-echo system comprising four directive antennas 10, 11, 12 and 13 for radiating up, down, right and left patterns, respectively, as indicated by the letters U, D, R and L. The radiation patterns for these antennas are overlapping conical patterns of the character indicated in Fig. 1a where only the right-left patterns are shown. The patterns marked R and L correspond to the antennas similarly marked in Fig. 1. The antennas 10, 11, 12 and 13 may be like those illustrated in the above-mentioned Wolff application, or of any other suitable type, and in the particular system being described are so mounted that they may be moved to make their radiation patterns scan both horizontally and vertically.

High frequency radio pulses are supplied successively to the U, R, D and L antennas from a transmitter 16 through cam operated switches 17, 18, 19 and 21, respectively, driven by a synchronous motor 22 connected to a power line 20. The complete switching cycle may occupy 1/60 second, for example. The said pulses are obtained by modulating the high frequency carrier wave produced at transmitter 16 by means of keying pulses from a source 23. The source 23 may be a multivibrator supplying pulses recurring at the rate of 4.1 kilocycles per second, for example.

The receiver 24 demodulates the reflected pulses of high frequency energy to supply 4.1 kc. pulses to a detector or rectifier 26 which preferably is of the peak rectifying type. In the circuit illustrated, the rectifier 26 is a grid-leak biased peak rectifier tube which is well known in the television art. The output of the rectifier 26 is passed through a low pass filter 25 and supplied through a large capacity blocking condenser 30 to a transformer 31. The output from the filter 25 is represented by the graph 32 where the four groups of filtered or integrated pulses are indicated at U, R, D, L.

The secondary of the transformer 31, which is grounded at its midpoint, supplies the received signal 32 through conductors 33 and 34 to the vertical deflecting plates 36 and 37 of a cathode ray tube 38. The signal 32 appears as substantially a sine wave voltage E36 (Figs. 1, 2 and 3) after passing through the transformer 31 since the transformer passes substantially only the fundamental frequency component.

The horizontal deflecting voltage (indicated at E41) for the horizontal deflecting plates 41 and 42 is supplied over conductors 43 and 44 from the junction points of the phase shifting elements 46, 47 and 48, 49, respectively. By properly proportioning the resistor 46 and capacitor 47 and the resistor 49 and capacitor 48, the horizontal deflecting voltage is shifted 90 degrees out of phase with respect to the vertical deflecting voltage. In Fig. 3, the graphs E36, E37, E41 and E42 represent the deflecting voltages on the deflecting plates 36, 37, 41 and 42, respectively. In this example, the cathode ray is unblocked or "keyed on" in the middle of the "up" switching period. Fig. 4 is a vector diagram of the same deflecting voltages. Suitable centering voltages may be applied from voltage dividers 51 and 52 through resistors 53 and 54, respectively, to the deflecting plates 36 and 41.

The cathode ray tube 38 is biased to electron beam cutoff or to low electron beam intensity until a positive pulse 56 is applied to the control grid 57 of the tube 38. As indicated by the graphs 32, E36, E41 and 56 in Fig. 1, the pulse 56 is applied during the middle of the switching period U. Thus, as will be discussed more fully hereinafter, a spot will appear in one of four quadrants of the fluorescent screen depending upon the polarities of the deflecting voltages and it will appear at a distance from the center of the screen that depends upon the amplitudes of the deflecting voltages. Preferably the circuit is provided with an A. V. C. circuit described below so that if there is no incoming signal, no pulse 56 will be produced and, therefore, there will be no indication on the fluorescent screen.

The pulse 56 may be produced by supplying 60 cycle sine wave voltage from the power line 20 through an amplifier tube 58 and a phase shifting network 59 to a pair of clipping tubes 61 and 62 whereby a square wave 63 is obtained. The wave 63 is differentiated by the grid circuit of the cathode ray tube 38 comprising a grid condenser 64 and a grid-leak resistor 66 to produce the desired positive pulse 56. By adjusting the phase shifter 59 the pulse 56 may be properly phased with respect to the sine wave deflecting voltages E36, etc.

An A. V. C. circuit comprising a diode 67 connected to the receiver output permits the amplifier tube 58 to pass the sine wave voltage only when there is an incoming signal. Thus, the cathode ray tube 38 is blocked so long as no signal is being received so that there will be no false indication.

Figs. 2 and 2a, Figs. 5 and 5a, and Figs. 6 and 6a illustrate the operation of the invention for three different positions of the target with respect to the four antenna radiation patterns.

Fig. 2 shows at 32' the amplitude of the received radio frequency pulses during an antenna switching sequence when the antenna system is pointing to the left of the target but is "on" the target in elevation. The signal 32 is the demodulated signal that, when passed through the transformer 31, becomes the sine wave voltage E36. The resulting cathode ray tube indication is shown in Fig. 2a.

Fig. 5 shows graphs corresponding to the graphs 32', 32 and E36 for the case where the antenna system is pointed below the target but is "on" the target in azimuth. The resulting indication is shown in Fig. 5a.

Fig. 6 shows solid line graphs which correspond to the graphs 32', 32 and E36 for the condition where the antenna system is pointed to the left of the target and below the target by equal amounts. The solid line graph E36 represents the vertical deflecting voltage and the dotted line graph E41 represents the 90 degree out-of-phase horizontal deflecting voltage. The resulting cathode ray tube indication is shown in Fig. 6a.

I claim as my invention:

1. An indicator for a radio pulse-echo system for locating a reflecting object, said system being of the type comprising a plurality of directive antennas having overlapping radiation patterns in the horizontal plane and having overlapping patterns in the vertical plane, a radio pulse transmitter unit and a radio pulse receiver unit, means for switching said antennas successively to at least one of said units whereby the reflected signal applied to the receiver unit during each switching period has an amplitude that depends upon the location of the reflecting object with respect to said radiation patterns, said indicator comprising a cathode ray tube having a pair of horizontal deflecting elements and a pair of vertical deflecting elements, means for passing the receiver output signal through an alternating-current circuit to obtain an alternating-current wave, means for applying said wave to one pair of said deflecting elements to deflect the cathode ray of said tube in one direction, means for also applying said alternating-current wave to a phase shifting circuit to shift its phase 90 degrees, means for applying said phase shifted wave to the other pair of deflecting elements, and means for changing the intensity of said cathode ray periodically and in synchronism with said alternating-current waves.

2. The invention according to claim 1 wherein said last means includes means for increasing the intensity of said cathode ray during the middle portion of a switching period.

3. The invention according to claim 1 wherein an automatic volume control circuit is provided to make said last means ineffective in the absence of an incoming signal.

4. An indicator for a radio pulse-echo system for locating a reflecting object, said system being of the type comprising a plurality of directive antennas having overlapping radiation patterns in the horizontal plane and having overlapping patterns in the vertical plane, a radio pulse transmitter unit and a radio pulse receiver unit, means for switching said antennas successively to at least one of said units whereby the reflected signal applied to the receiver unit during each switching period has an amplitude that depends upon the location of the reflecting object with respect to said radiation patterns, said indicator comprising a cathode ray tube having a pair of horizontal deflecting elements and a pair of vertical deflecting elements, means for passing the receiver output signal through an alternating-current circuit to obtain an alternating-current wave, means for applying said wave to one pair of said deflecting elements to deflect the cathode ray of said tube in one direction, means for also applying said alternating-current wave to a phase shifting circuit to shift its phase 90 degrees, means for applying said phase shifted wave to the other pair of deflecting elements, and means for increasing the intensity of said cathode ray once during each complete cycle of said antenna switching and in synchronism with said alternating-current waves.

5. The invention according to claim 4 wherein said last means comprises means for producing a square wave and means for differentiating said square wave to produce positive pulses which are applied to said cathode ray tube.

6. In combination, means for transmitting radio signals and means for receiving them after reflection from an echo source, at least one of said means including an assembly of directive antennas having in each of two planes overlapping radiation patterns, switching means for making said patterns effective successively to supply signals to a receiving circuit, said radiation patterns having characteristics such that the received signal differs in strength for the successive radiation patterns in accordance with the displacement of said radiation patterns with respect to the source of the echoes, a cathode ray tube indicator having two pairs of deflecting elements that are angularly displaced with respect to each other, means for applying to one pair of said deflecting elements an alternating-current wave that is proportional in amplitude to the fundamental alternating-current component of the received signal, means for applying to the other pair of said deflecting elements a corresponding alternating-current wave that is 90 degrees out of phase with respect to said first alternating-current wave, and means for changing the intensity of said cathode ray periodically and in synchronism with said alternating-current waves.

HENRY E. RHEA.